United States Patent [19]
Kim

[11] Patent Number: 5,476,672
[45] Date of Patent: Dec. 19, 1995

[54] KIMCHI FERMENTATION AND/OR STORAGE CONTROL METHOD FOR A REFRIGERATOR

[75] Inventor: Kyung M. Kim, Suweon, Rep. of Korea

[73] Assignee: Samsung Electronics Co., Ltd., Suweon, Rep. of Korea

[21] Appl. No.: 95,341

[22] Filed: Jul. 23, 1993

Related U.S. Application Data

[62] Division of Ser. No. 9,758, Jan. 27, 1993, abandoned.

[30] Foreign Application Priority Data

Feb. 1, 1992 [KR] Rep. of Korea ............... 92-1641

[51] Int. Cl.[6] ............................................. A23B 7/00
[52] U.S. Cl. ...................................... 426/231; 426/49
[58] Field of Search .................... 426/7, 49, 61, 426/231; 165/48

[56] References Cited

U.S. PATENT DOCUMENTS

| | | | |
|---|---|---|---|
| 2,504,794 | 4/1950 | Berman et al. | 165/64 |
| 3,143,167 | 8/1964 | Vieth | 165/64 |
| 3,516,485 | 6/1970 | Rhoads et al. | 165/48.1 |
| 3,845,274 | 10/1974 | Krenke et al. | 165/169 |
| 4,387,578 | 6/1983 | Paddock | 62/127 |
| 4,913,914 | 4/1990 | Hashimoto et al. | 426/46 |
| 4,993,480 | 2/1991 | Suzuki et al. | 165/2 |
| 5,118,626 | 6/1992 | Hashimoto et al. | 435/289 |
| 5,142,969 | 9/1992 | Chun | 99/468 |
| 5,228,499 | 7/1993 | Yoon | 165/2 |

*Primary Examiner*—George Yeung
*Attorney, Agent, or Firm*—Burns, Doane, Swecker & Mathis

[57] ABSTRACT

A Kimchi fermentation and/or storage control apparatus of a refrigerator includes at least one compartment for holding Kimchi; a heater for raising the temperature of the compartment to a predetermined fermentation temperature; a cooling device for lowering the temperature of the compartment to a predetermined storage temperature; a temperature setting and mode selecting section; a temperature sensing means for the compartment; and, a microprocessor for controlling the operations of the heating means and the cooling means according to the signals supplied to the temperature setting and mode selecting section and the temperature sensor means. The microprocessor previously stores in its memory the mathematical product of amount of the time, required to obtain the acidity level of Kimchi considered as the optimum fermentation condition at a given temperature, multiplied by the temperature as a "fermentation completion value". The microprocessor determines when the "fermentation completion value" is in accordance with the integral function value of the accumulated inner temperatures of the compartment in a given time interval.

1 Claim, 6 Drawing Sheets

KIMCHI FERMENTATION AND/OR STORAGE CONTROL METHOD FOR A REFRIGERATOR

This application is a divisional, of application Ser. No. 08/009,758, filed Jan. 27, 1993 now abandoned.

BACKGROUND OF THE INVENTION

1. Field of the Invention

The present invention relates to a refrigerator and a method of controlling a refrigerator adapted for fermenting and/or storing Kimchi, and particularly to a fermentation and/or storage control apparatus which determines the fermentation condition of the Kimchi by calculating the product of temperature and time, thereby controlling fermentation of the Kimchi.

2. Description of the Prior Art

Kimchi is a traditional Korean naturally fermented food which is made of radish, cabbage or cucumber, spiced with pepper, garlic, onion, ginger, and so on. The unique taste of Kimchi is achieved, in part, by various kinds of organic acids which are formed by the respiration process of the microorganisms which are present in the ingredients. The Kimchi fermentation process chiefly relies on temperature and time. Within certain ranges, the higher the ambient temperature, the faster the fermentation process will develop. On the other hand, even when different batches of Kimchi are processed at the same temperature, the fermentations will be different according to the length of the fermentation process. In order to preserve optimally fermented Kimchi for a long time, it is required to initially ferment it at a predetermined temperature for a predetermined period of time and then to preserve it at a temperature lower than the fermentation temperature. Accordingly, in order to meet these requirements, a refrigerator with the capability to ferment and/or store Kimchi, and a refrigerator exclusively designed to ferment and/or Store Kimchi has been developed. In these conventional refrigerators designed for Kimchi, the fermentation and/or storage of Kimchi is controlled to provide the optimum condition for fermentation as determined by experiments. That is, the fermentation of Kimchi is performed by merely maintaining the inner temperature of the Kimchi compartment at a predetermined temperature for a predetermined period of time, regardless of the actual fermentation condition. However, in such conventional refrigerators, the inner temperature of the Kimchi compartment varies due to external factors such as fluctuations in the input power supply and the compartment door opening and closing. Consequently, there is a problem that the Kimchi is often over-fermented or under-fermented.

SUMMARY OF THE INVENTION

It is an object of the invention to provide a Kimchi fermentation and/or storage control apparatus and a control method for a refrigerator for optimally fermenting and/or storing Kimchi.

It is another object of the invention to provide a Kimchi fermentation and/or storage control apparatus and a control method for a refrigerator for optimally fermenting and/or storing Kimchi based on precise calculations of the actual fermentation condition.

It is still another object of the invention to provide a Kimchi fermentation and/or storage control apparatus and a control method for a refrigerator for optimally fermenting and/or storing Kimchi based on the integral function value of the actual fermentation temperature over the actual fermentation time.

According to the present invention, a refrigerator for Kimchi comprises at least one compartment for holding Kimchi. Also, a control apparatus of the present invention comprises a heating means for raising the inner temperature of the compartment to a predetermined fermentation temperature; a cooling means, including a compressor, a condenser and a refrigerant tube, for lowering the interior temperature of the compartment to a predetermined storage temperature; a temperature setting and mode selecting section for setting the fermentation and storage temperatures and selecting the desired operation mode of the refrigerator; temperature sensing means for sensing the inner and outer temperatures of the compartment; and a microprocessor for controlling the operations of the heating means and the cooling means according to signals supplied to the temperature setting and mode selecting section and the temperature sensing means.

The present invention further includes, a Kimchi fermentation and/or storage control method for in the apparatus described above comprising the steps of: selecting either a "fermentation and storage" mode or a "simple storage" mode; setting a fermentation temperature and a storage temperature when the "fermentation and storage" mode is selected in the mode selecting step; sensing the inner and outer temperatures of the compartment; maintaining the temperature in the inner space of the compartment at the set fermentation temperature; determining whether the fermentation process is completed or not; maintaining the temperature in the inner space of the compartment at the set storage temperature when the fermentation is completed; and, setting a storage temperature and maintaining in the inner space of the compartment at the set storage temperature when the "storage" mode is selected in the mode selecting step.

BRIEF DESCRIPTION OF THE DRAWINGS

These and other aspects of the present invention are clarified in the accompanying drawings in which.

DETAILED DESCRIPTION OF PREFERRED EMBODIMENTS

Hereinafter, a control apparatus and method according to the present invention will be described in detail in reference to the accompanying drawings.

Figure 1:
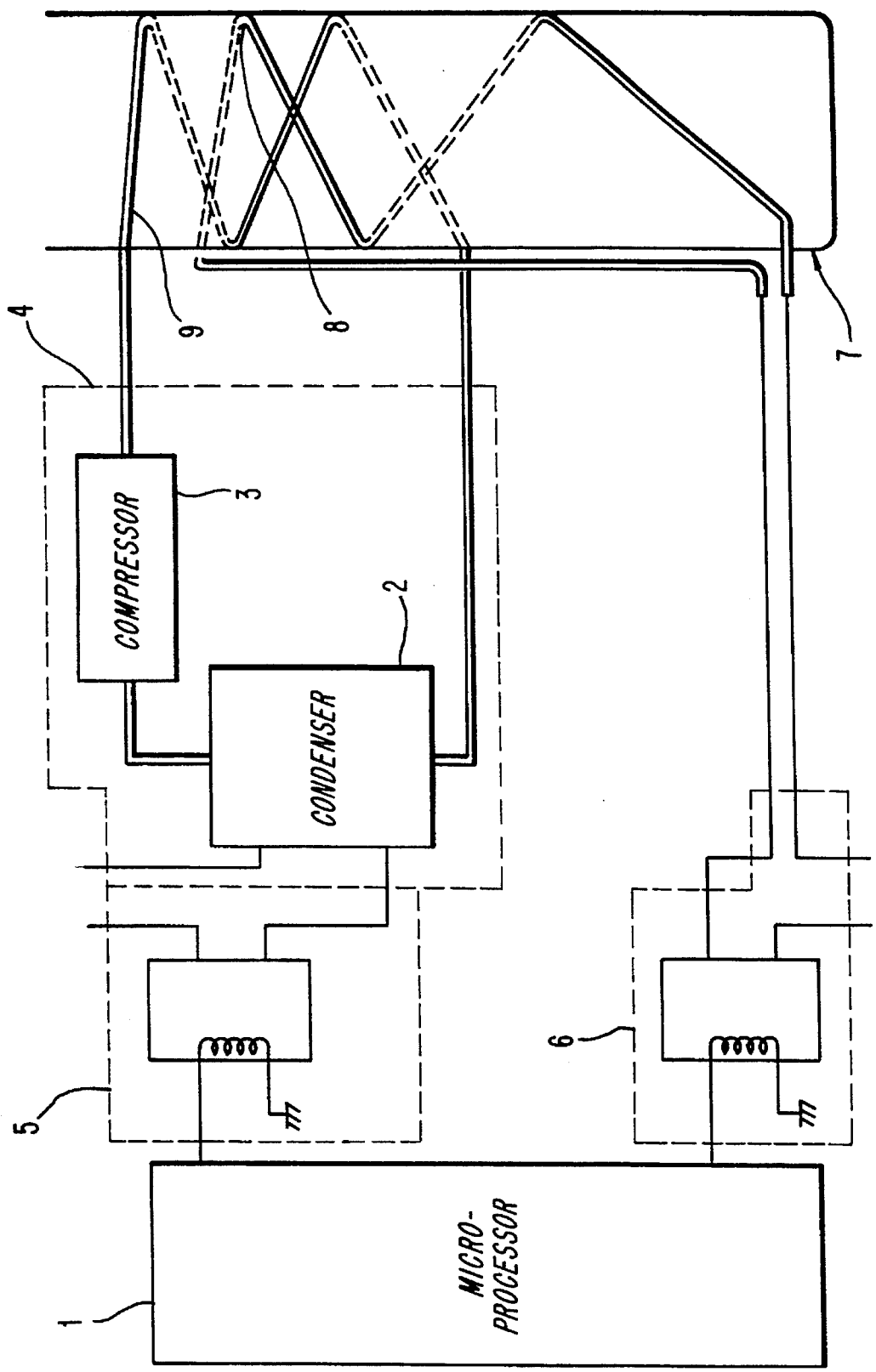
FIG. 1 is a schematic diagram showing a refrigerator for Kimchi according to the present invention.

FIG. 1 is a schematic diagram showing a refrigerator for Kimchi according to the present invention. The refrigerator for Kimchi largely comprises a control section 1, a cooling means 4, a heater 8, a cooling means and a heater driving sections 5 and 6, and a Kimchi compartment 7. The control section 1 controls all the operations of the refrigerator. The Kimchi compartment 7 is used for the fermentation or the storage of Kimchi, and the heater 8 and the refrigerant tube 9 are wound around the exterior surface thereof without coming into contact with each other. This enables the temperature throughout the Kimchi compartment 7 to be evenly maintained. The heater 8 is used for raising the temperature of the Kimchi compartment 7 to the appropriate fermentation temperature. The cooling means 4, which includes a compressor 3, a condenser 2 and a refrigerant tube 9, is used for lowering the temperature of the Kimchi compartment 7 to an appropriate storage temperature. The cooling means and heater drive sections 5 and 6, which respectively include relay means, control the supply of power to the cooling means 4 and the heater 8.

Figure 2:
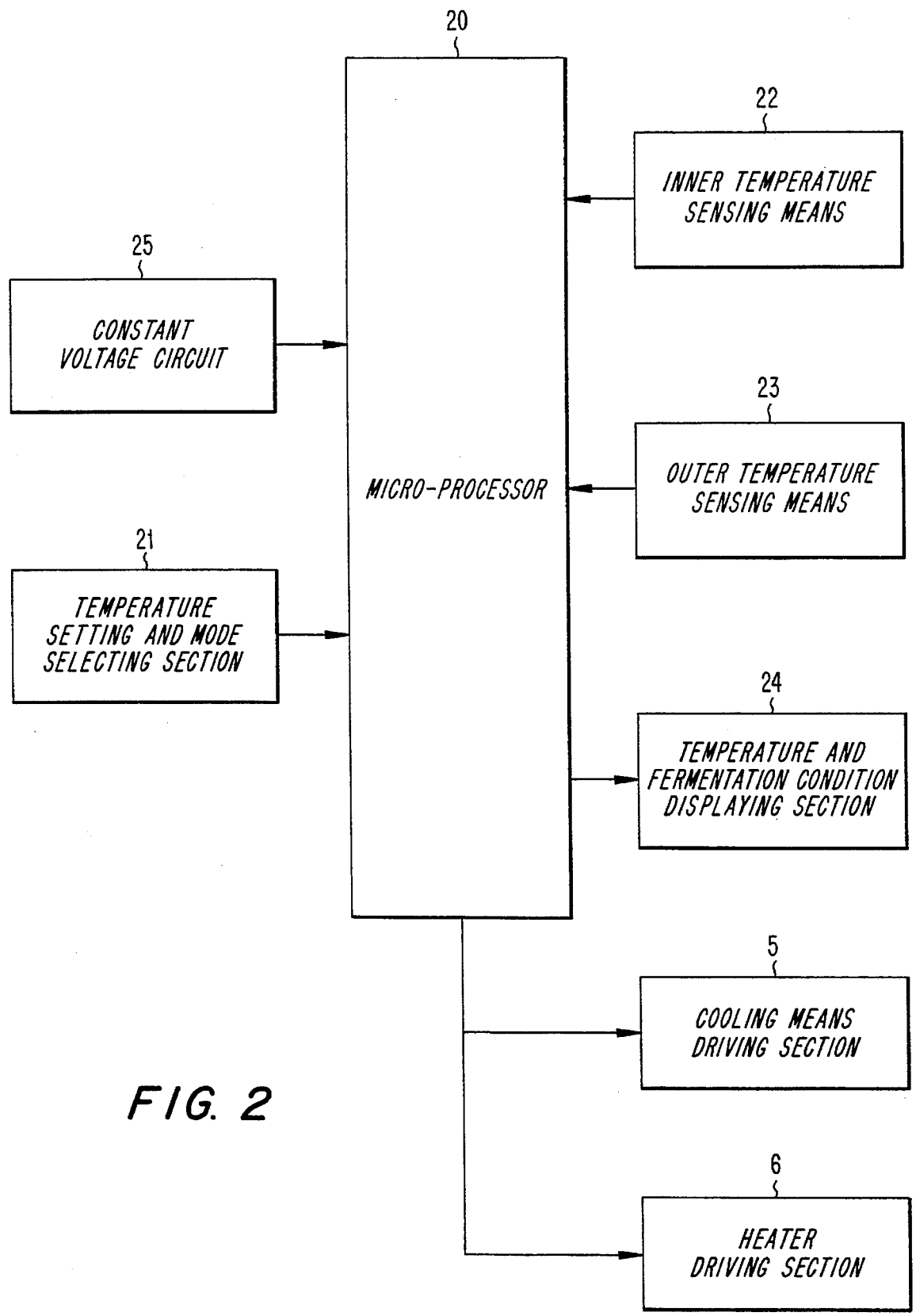
FIG. 2 is a block diagram showing a control apparatus according to the present invention.

FIG. 2 is a block diagram showing a control apparatus according to the present invention. The control apparatus comprises a microprocessor 20, a temperature setting and mode selecting section 21, an inner and an outer temperature sensing means 22 and 23 of the Kimchi compartment 7, a temperature and fermentation condition displaying section 24 and a constant voltage circuit 25. The microprocessor 20 controls all the operations of the appliance according to the loaded programs. The temperature setting and mode selecting section 21 is used for setting the fermentation or storage temperature and for selecting various modes, for example, a "fermentation and storage" mode, a "simple storage" mode or the like. The temperature sensing means 22 and 23 are mounted at the proper positions of the interior and exterior surfaces, respectively, of the Kimchi compartment 7, which ensures accuracy in driving the cooling means 4 and the heater 8 after the temperature sensing errors of the inner and outer surfaces of the Kimchi compartment 7 are taken into account. The temperature signals from the sensing means 22 and 23 are supplied to the microprocessor 20. The temperature and fermentation condition displaying section 24 displays the current temperature and fermentation condition for the user to read.

Figure 3:
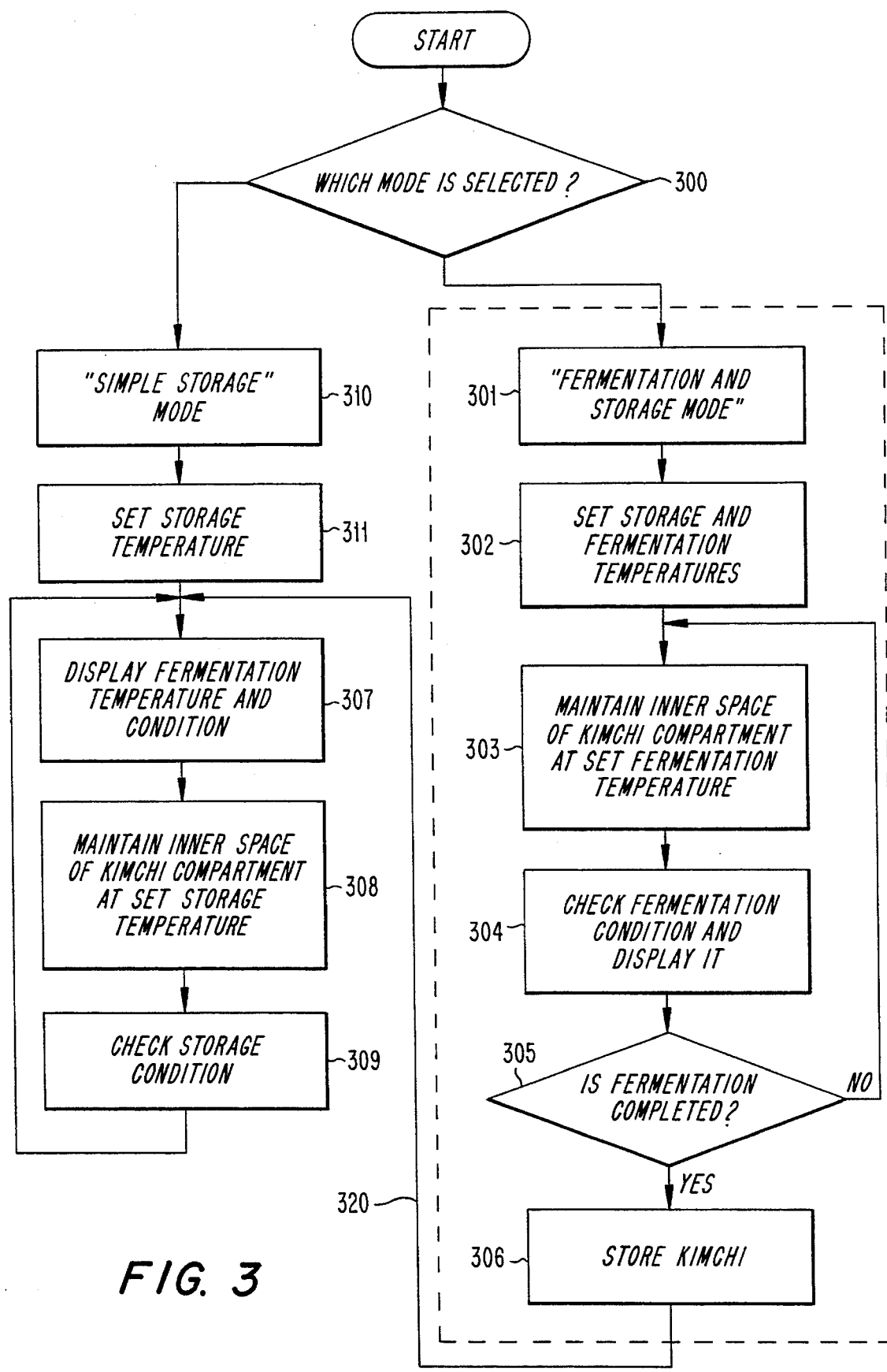
FIG. 3 is a flow-chart showing a control method according to the present invention.

FIG. 3 is a flow-chart showing a control method according to the present invention. At stage 300, the microprocessor 20 determines whether a selected mode is a "fermentation and storage" mode or a "simple storage" mode, thereby controlling the subsequent operations of the refrigerator according to the selected mode. Initially, if the "fermentation and storage" mode is selected, then the process goes to stage 302 and the fermentation and storage temperatures are set in the microprocessor 20. Next, at stages 303 to 305, the microprocessor 20 properly controls the drive of the cooling means 4 and the heater 8 so as to maintain the temperature in the Kimchi compartment 7 at the set fermentation temperature and simultaneously determines whether the fermentation process is completed. The fermentation processes will be described in more detail with reference to FIGS. 4 to 7.

Figure 4:
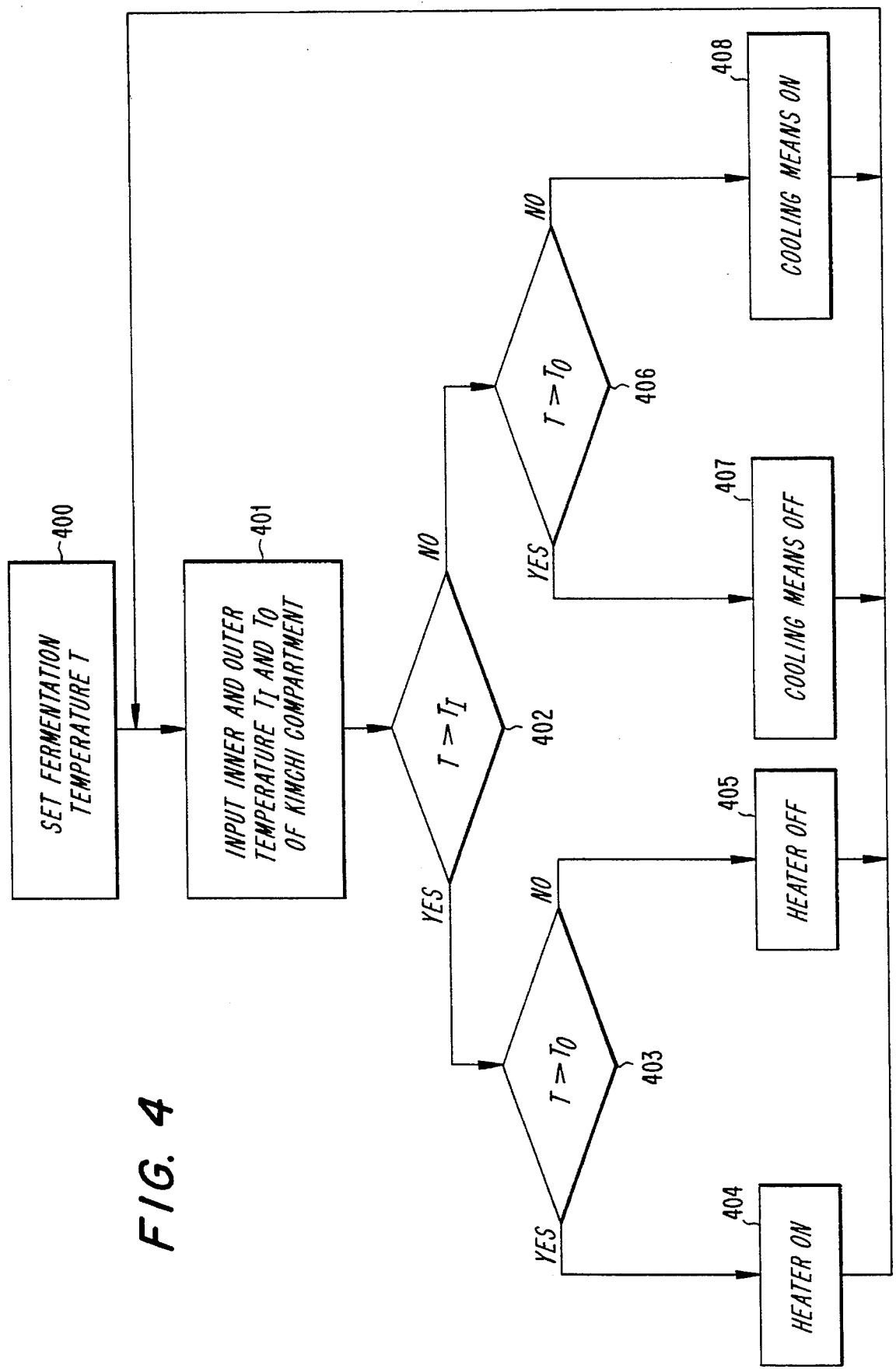
FIG. 4 is a flow-chart showing a temperature control method according to the present invention.

FIG. 4 is a flow-chart showing a temperature control method according to the present invention. At stage 402, the microprocessor 20 compares the inner temperature $T_I$ of the Kimchi compartment 7 with the set fermentation temperature T. In the comparison result at stage 402, if the temperature T is higher than the temperature $T_I$, the process proceeds to stage 403 and the microprocessor 20 compares the outer temperature $T_O$ with the temperature T again, the operation of the heater 8 is thereby ultimately controlled according to the results of the comparison. That is, the microprocessor 20 has the heater 8 turn "on" at stage 404 only if the set fermentation temperature T is higher than both the inner and outer temperatures $T_I$ and $T_O$ of the Kimchi compartment 7, while the microprocessor 20 has the heater 8 turn "off" at stage 405 if the temperature T is higher than the temperature $T_I$ and lower than the temperature $T_O$.

On the other hand, in the comparison result at stage 402, if the temperature T is lower than the temperature $T_I$, the process proceeds to stage 406 and the microprocessor 20 compares the outer temperature $T_O$ with the temperature T again, the operation of the cooling means 4 is thereby ultimately controlled according to the results of the comparison. That is, the microprocessor 20 has the cooling means 4 turn "on" at stage 408 only if the set fermentation temperature T is lower than both the inner and outer temperatures $T_I$ and $T_O$ of the Kimchi compartment 7, while microprocessor 20 has the cooling means 4 turn "off" at stage 407 if the temperature T is lower than the temperature $T_I$ and higher than the temperature $T_O$. This type of temperature control method aims not only to precisely maintain the inner space of the Kimchi compartment 7 at the set fermentation temperature by means of the natural thermal conduction from the outer surface to the inner surface, but also to prevent the frequent operation of the cooling means 4 and the heater 8.

Figure 5:
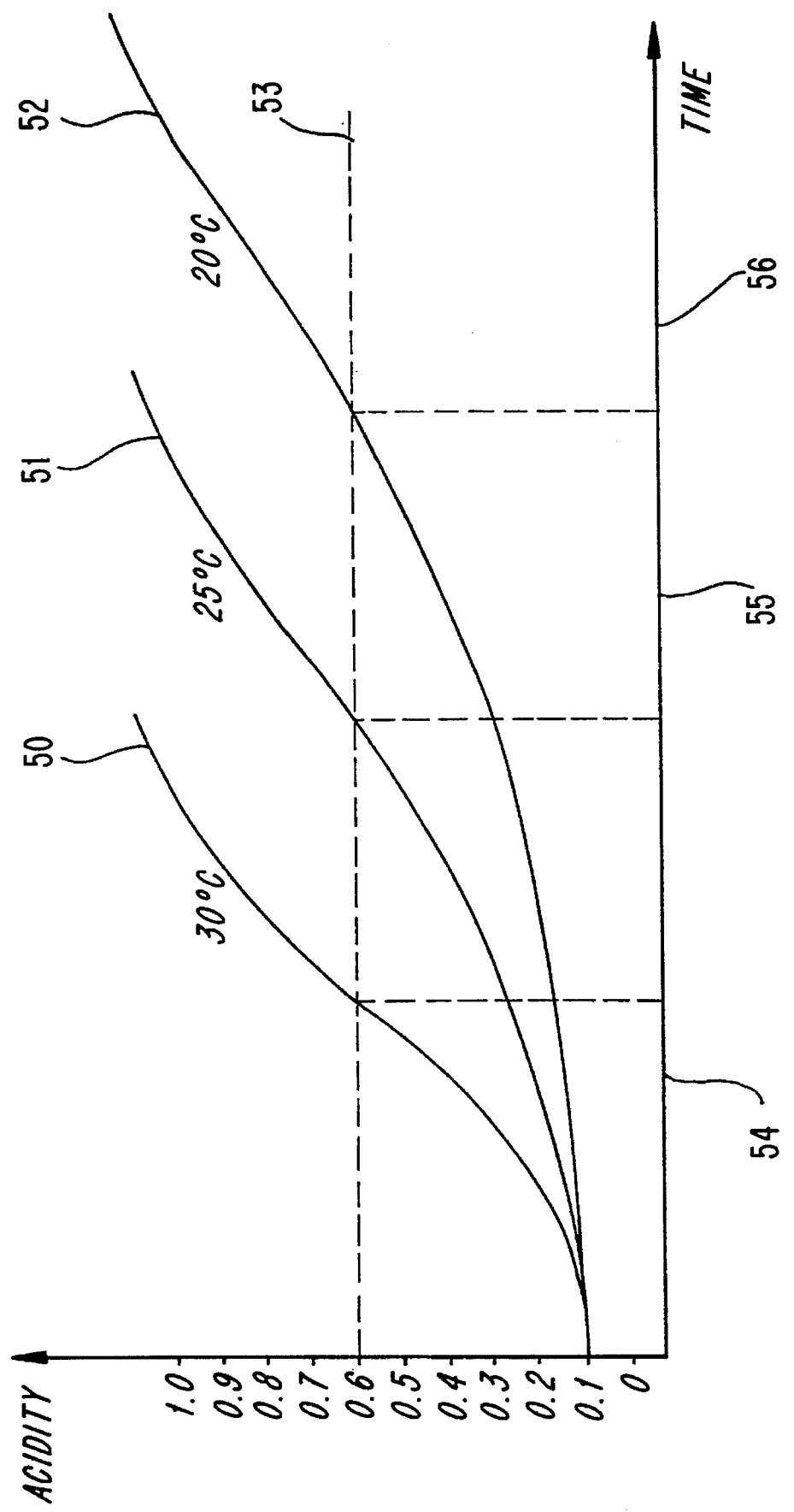
FIG. 5 is a graph illustrating the relationship between the acidity level of the Kimchi and the fermentation temperature and fermentation time.

FIG. 5 is a graph illustrating the relationship between the acidity level of the Kimchi and the fermentation temperature and fermentation time. As shown by the curves 50 to 52 illustrated in FIG. 5, the greater the fermentation time, the greater the concentration of organic acids. Accordingly, the overall acidity in the Kimchi increases. Also, the higher the fermentation temperature becomes, the more active the respiratory activity of the microorganisms and thus the acidity in the Kimchi abruptly increases. Moreover, it has been demonstrated in experiments that the acidity at which Kimchi is optimally fermented is around 0.6. As identified in FIG. 5, the time required to complete the fermentation with an acidity of 0.6 is roughly in inverse proportion to the fermentation temperature.

Figure 6:
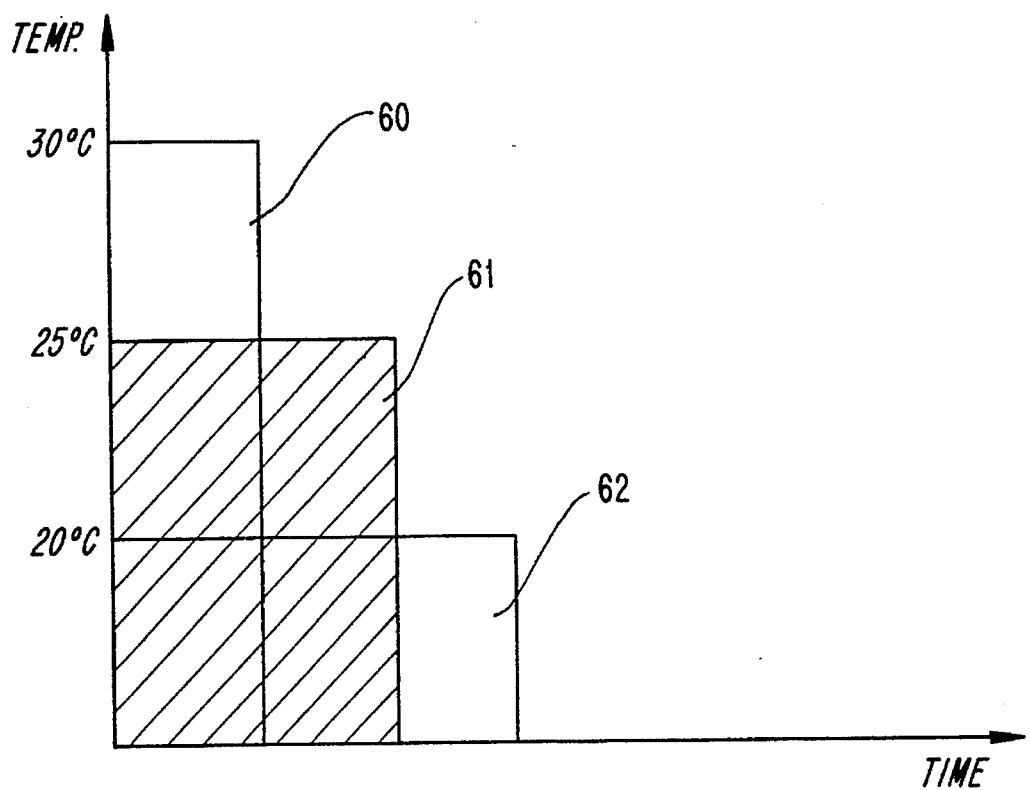
FIG. 6 is a graph illustrating the relationship between the fermentation time and the fermentation temperature; and, FIG. 7 is a graph illustrating an example of the variations of the inner temperature of the Kimchi compartment.

FIG. 6 is a graph illustrating the relationships between fermentation completing time and fermentation temperature. In FIG. 6, each area representing the final product of the fermentation temperature and completing time is the same. Accordingly, microprocessor 20 previously stores the mathematical product of a time, required to obtain the acidity level of Kimchi considered to be the optimum fermentation condition at a given temperature, for example 25° C., multiplied by the temperature as a "fermentation completion value" in its memory. Next, the microprocessor 20 determines when the "fermentation completion value" is in accordance with the integral function value of the accumulated inner temperatures of the compartment in a given time interval, and thereby the fermentation time is controlled.

Figure 7:
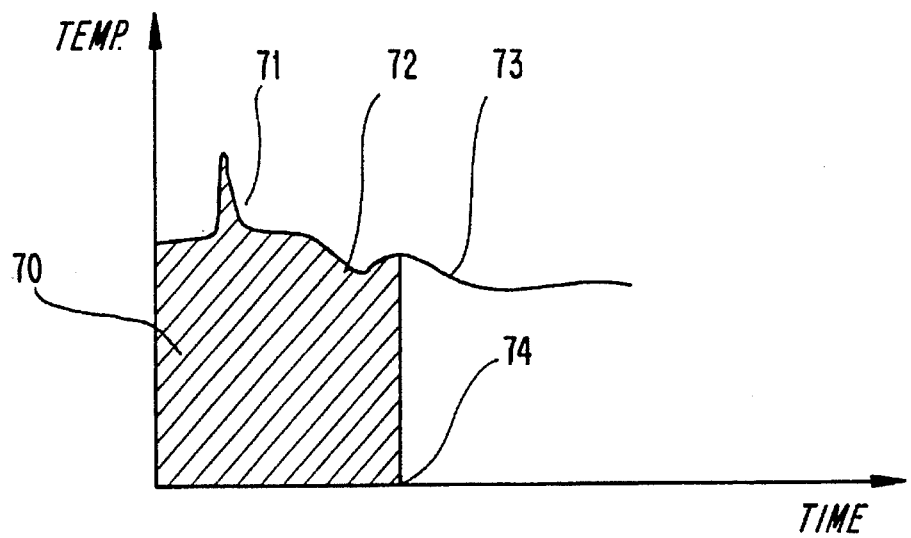

FIG. 7 is a graph illustrating an example of the variations of the inner temperature of the Kimchi compartment. As illustrated, the inner temperature of the Kimchi compartment 7 varies due to external factors such as fluctuations in the input power supply and the compartment door opening and closing. The shaded area 70 shown in FIG. 7 is equal to the area 61 shown in FIG. 6. That is, the microprocessor 20 calculates the integral function value based on the signal from the temperature sensing means 22 in a specific time interval and then compares the integral function value with the "fermentation completion value". When the two values become in accordance with each other, microprocessor 20 has the heater 8 turn "off" so as to complete the fermentation process. Thus, it is possible to optimally ferment Kimchi in spite of the variations in the temperature of the Kimchi compartment 7 due to the external factors. Moreover, it is also possible to display the fermentation condition as the ratio of the current integral function value to the "fermentation completion value".

The instant the fermentation process has passed through the afore-mentioned steps, the storage process begins. The microprocessor 20 has the cooling means 4 turn "on" so as to abruptly lower the inner temperature of the Kimchi compartment 7 at the storage temperature set at stage 302. Moreover, the storage temperature and the fermentation condition are displayed on the temperature and fermentation condition displaying section 24. Next, at stage 308, the microprocessor 20 regulates the cooling means 4 and the heater 8 by turns in the same fashion in the fermentation process, thereby maintaining the inner temperature of the Kimchi compartment 7 at the set storage temperature. On the other hand, if the "simple storage" mode is selected at stage 300, the process goes directly to stage 311 and microprocessor 20 sets the storage temperature in its memory. The following steps are the same as the afore-mentioned steps taken when the "fermentation and storage" mode is selected.

I claim:

1. A control method including a fermentation and storage mode as well as a storage mode in an apparatus, which includes a compartment for receiving a fermentable substance, cooling means for cooling said compartment, heating means for heating said compartment, a temperature setting and mode selecting section, a temperature sensing means for sensing temperature inside said compartment, and a microprocessor for controlling all operations of the apparatus, said method comprising the steps of:

setting a fermentation temperature and a storage temperature;

determining whether or not a fermentation process is completed including the steps of:

storing a fermentation completion value, which is a mathematical product of a time required to obtain an optimum level of the fermentation substance at a given temperature and the given temperature in a memory of the microprocessor;

accumulating a product value of the inner temperature of the compartment at given time intervals;

determining that the fermentation process is completed if said accumulated product value is equal to said stored fermentation completion value; and maintaining the inner temperature of the compartment at the storage temperature after said fermentation process is completed; and determining whether or not said storage mode is selected and, if said storage mode is selected, performing the steps of;

sensing an inner temperature of said compartment; and maintaining an inner temperature of said compartment at said storage temperature.

* * * * *